(12) United States Patent
Newton et al.

(10) Patent No.: US 10,000,347 B2
(45) Date of Patent: Jun. 19, 2018

(54) ADJUSTABLE MULTI-HOLE ORIFICE IN A PNEUMATIC CONVEYING APPARATUS

(71) Applicant: Schenck Process UK Limited, Edinburgh (GB)

(72) Inventors: Michael Newton, Doncaster (GB); Richard Ellis, Doncaster (GB)

(*) Notice: Subject to any disclaimer, the term of this patent is extended or adjusted under 35 U.S.C. 154(b) by 0 days. days.

(21) Appl. No.: 15/502,065

(22) PCT Filed: Aug. 7, 2015

(86) PCT No.: PCT/GB2015/052294
§ 371 (c)(1),
(2) Date: Feb. 6, 2017

(87) PCT Pub. No.: WO2016/020700
PCT Pub. Date: Feb. 11, 2016

(65) Prior Publication Data
US 2017/0225909 A1    Aug. 10, 2017

(30) Foreign Application Priority Data

Aug. 7, 2014 (GB) .................................. 1413984.4

(51) Int. Cl.
*B65G 53/12* (2006.01)
*B65G 53/46* (2006.01)

(52) U.S. Cl.
CPC .................... *B65G 53/4616* (2013.01)

(58) Field of Classification Search
CPC ........................... B65G 53/12; B65G 53/4616

USPC ........... 406/83, 92, 125, 128, 144, 146, 194; 137/571
See application file for complete search history.

(56) References Cited

U.S. PATENT DOCUMENTS

| | | | | |
|---|---|---|---|---|
| 2,550,781 A | | 5/1951 | Colburn | |
| 3,697,041 A | * | 10/1972 | Bschorer | B23Q 35/18 137/625.17 |
| 3,707,169 A | * | 12/1972 | Friedrichs | F01B 3/0008 137/625.21 |
| 3,776,599 A | * | 12/1973 | Reuter | B65G 53/12 222/195 |
| 3,795,348 A | * | 3/1974 | Vertue | B05B 7/1404 406/153 |
| 3,987,819 A | * | 10/1976 | Scheuermann | F16K 11/0746 137/625.41 |
| 4,009,912 A | * | 3/1977 | Mraz | B65G 53/14 406/11 |
| 4,061,401 A | * | 12/1977 | Brown | B65G 53/4691 406/128 |
| 4,182,383 A | * | 1/1980 | Admotis | B65B 1/16 141/5 |
| 4,483,370 A | * | 11/1984 | Talasz | F03B 11/004 138/45 |

(Continued)

FOREIGN PATENT DOCUMENTS

| | | |
|---|---|---|
| GB | 2177681 | 1/1987 |
| JP | H102435 | 1/1998 |
| WO | WO 1993/01431 | 1/1993 |

*Primary Examiner* — Joseph Dillon, Jr.
(74) *Attorney, Agent, or Firm* — Robert G. Lev

(57) ABSTRACT

There is herein described an adjustable multi-hole orifice plate in a pneumatic conveying apparatus. More particularly, there is described an adjustable multi-hole orifice plate which can be used in a pneumatic conveying apparatus to assist in the discharge of material.

9 Claims, 7 Drawing Sheets

PROCESS DIAGRAM OF TYPICAL
TWIN VESSEL PNEUMATIC INJECTION SYSTEM
SHOWING ORIFICE PLATE POSITIONS

(56) References Cited

U.S. PATENT DOCUMENTS

| | | | | |
|---|---|---|---|---|
| 4,511,291 A * | 4/1985 | Quates, Sr. | | B65G 53/14 |
| | | | | 406/128 |
| 4,662,799 A * | 5/1987 | Paul | | B65G 53/12 |
| | | | | 406/14 |
| 4,765,781 A * | 8/1988 | Wilks | | F01K 9/003 |
| | | | | 222/136 |
| 5,222,840 A * | 6/1993 | Ingraham | | B65G 51/03 |
| | | | | 226/97.3 |
| 5,407,305 A * | 4/1995 | Wallace | | B65G 53/66 |
| | | | | 406/11 |
| 5,542,361 A * | 8/1996 | Lilja | | F27D 99/0033 |
| | | | | 110/104 B |
| 5,997,220 A * | 12/1999 | Wormser | | B65G 53/4616 |
| | | | | 222/367 |
| 6,250,324 B1 | 6/2001 | Conrad | | G05D 11/006 |
| | | | | 137/890 |
| 6,648,558 B1 * | 11/2003 | Shultz | | B65G 53/12 |
| | | | | 137/571 |
| 6,695,229 B1 | 2/2004 | Heinbuch | | F02M 61/162 |
| | | | | 239/491 |
| 7,156,372 B2 | 1/2007 | Kelsey | | B65B 1/16 |
| | | | | 141/70 |
| 7,213,587 B2 * | 5/2007 | Rutten | | F02M 26/70 |
| | | | | 123/568.24 |
| 7,296,919 B2 * | 11/2007 | Petersen | | F16K 7/06 |
| | | | | 366/192 |
| 8,061,295 B2 * | 11/2011 | Zimmerman | | E01C 23/166 |
| | | | | 118/308 |
| 8,337,122 B2 * | 12/2012 | Schultz | | B65G 53/66 |
| | | | | 406/137 |
| 8,377,387 B2 * | 2/2013 | Dinu | | C10J 3/506 |
| | | | | 406/86 |
| 8,602,693 B2 * | 12/2013 | Bligh | | B01J 8/0025 |
| | | | | 406/136 |
| 9,638,190 B2 * | 5/2017 | Yoshida | | F01C 21/108 |
| 2003/0041675 A1 * | 3/2003 | Armstrong | | G01F 5/00 |
| | | | | 73/861.52 |
| 2004/0082251 A1 * | 4/2004 | Bach | | C23C 16/45563 |
| | | | | 445/60 |
| 2009/0124945 A1 * | 5/2009 | Reich | | A61C 17/0214 |
| | | | | 601/165 |
| 2011/0239915 A1 * | 10/2011 | Ferri | | F23C 7/008 |
| | | | | 110/261 |
| 2014/0242721 A1 * | 8/2014 | Kellogg | | G01N 33/543 |
| | | | | 436/501 |
| 2015/0078948 A1 * | 3/2015 | Yoshida | | F01C 21/108 |
| | | | | 418/259 |
| 2015/0211743 A1 * | 7/2015 | DeFoort | | F24B 1/202 |
| | | | | 126/9 R |
| 2015/0315074 A1 * | 11/2015 | Ueno | | B28C 5/16 |
| | | | | 106/680 |

\* cited by examiner

Fig 1 – Section through multi hole orifice plate mounted in pipework

PROCESS DIAGRAM OF TYPICAL
TWIN VESSEL PNEUMATIC INJECTION SYSTEM
SHOWING ORIFICE PLATE POSITIONS

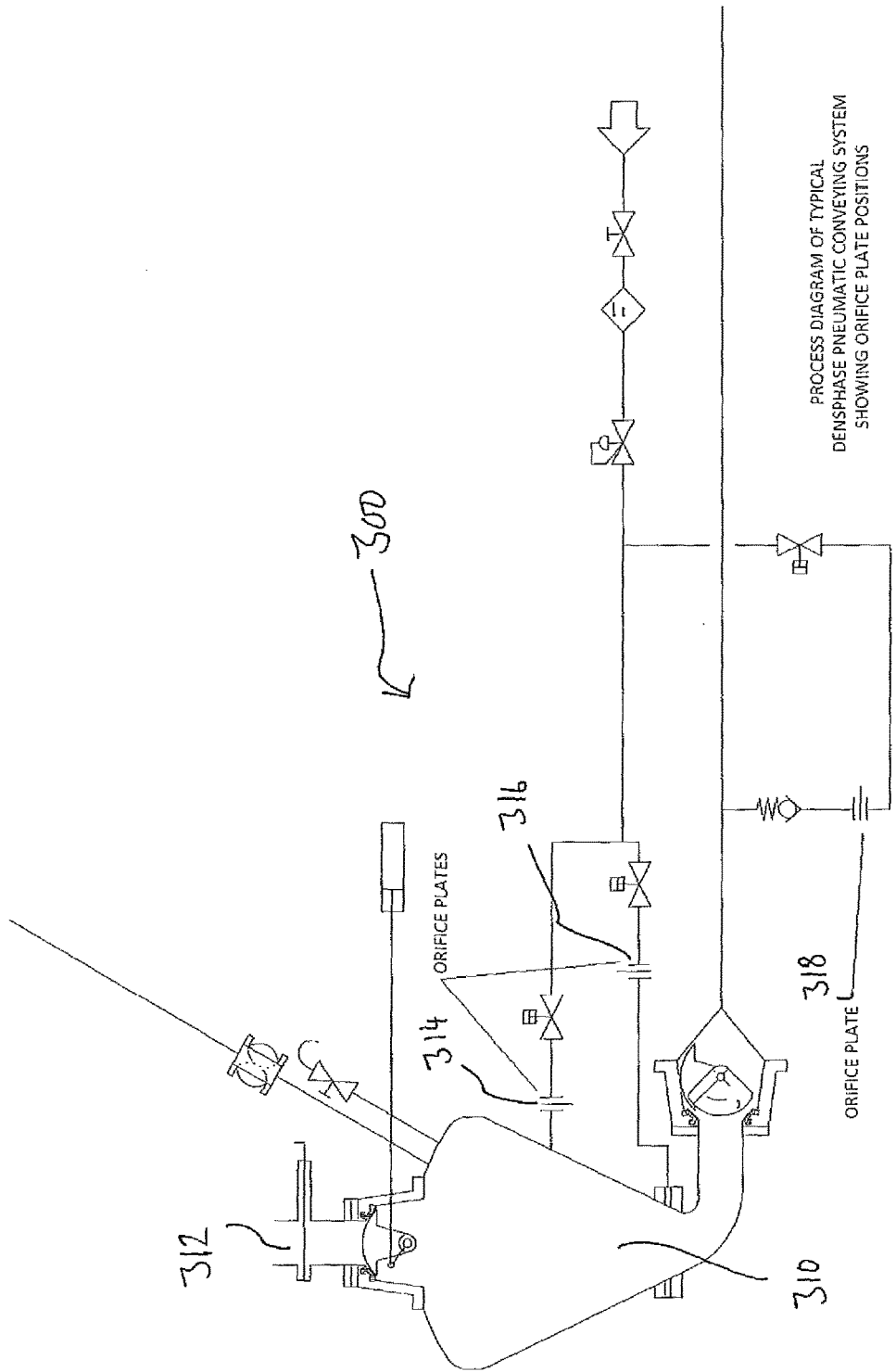

ADJUSTABLE MULTI-HOLE ORIFICE IN A PNEUMATIC CONVEYING APPARATUS

PRIORITY INFORMATION

The present application claims priority as a national stage entry of International Application No: PCT/GB2015/052294, filed on Aug. 7, 2015, which claims priority from GB App. No: 1413984.4, filed on Aug. 7, 2014.

FIELD OF THE INVENTION

The present invention relates to an adjustable multi-hole orifice plate in a pneumatic conveying apparatus. More particularly, the present invention relates to an adjustable multi-hole orifice plate which can be used in a pneumatic conveying apparatus to assist in the discharge of material.

BACKGROUND OF THE INVENTION

To assist the discharge of material from pneumatic conveying vessels and to the final delivery point gas is fed into various points on a vessel through a distribution manifold. From test data and knowledge the gas split through the manifold can be calculated.

Orifice plates are used to control the flow of gas through the gas distribution manifold. The number and size of holes required in the orifice plate can be calculated using real life data and using the following mathematical calculation: the gas flow (volume/time); the area of the orifice (area) and the velocity of the gas (distance/time).

The calculation gives the theoretical area and therefore the size and number of holes necessary to convey the material. Often, during commissioning, adjustments have to be made to the air distribution through the manifold to get the material to convey. This is achieved by altering the number of holes in the orifice plate.

Changing the number of holes in the orifice plate is usually done by drilling additional holes in a steel plate or welding over the existing holes to reduce the number of holes. As the pneumatic conveying vessels are situated in process plants any work on the system has to be carried out under a permit to work and any modifications carried out in a workshop that could be on the other side of the plant to the vessel. To modify the prior art devices is therefore time consuming and requires specialist tools.

Prior art devices which use adjustable flow control methods often use a single hole with a restrictor of some kind e.g. needle or moveable plug. Again such devices have disadvantages.

It is an object of at least one aspect of the present invention to obviate or mitigate at least one or more of the aforementioned problems.

It is a further object of at least one aspect of the present invention to provide an improved orifice plate for assisting the discharge of material from a pneumatic conveying apparatus.

SUMMARY OF THE INVENTION

According to a first aspect of the present invention there is provided a pneumatic conveying apparatus comprising:
an adjustable multi-hole orifice plate which has a front and back plate;
the front plate has a series of radial apertures or slots and the back plate has a series of holes; and
wherein the front and/or back plate is capable of being rotated to close and expose the holes and thereby control the flow of air through a manifold and hence the discharge of material.

The present invention therefore resides in the provision of an adjustable multi-hole orifice plate which can be used in a pneumatic conveying apparatus to assist in the discharge of material.

The adjustable multi-hole orifice may be mounted in pipework with a flow of gas moving through the hoes in the multi-hole orifice. The holes may have a size of about 1-20 mm or preferably about 2-8 mm.

The adjustable multi-hole orifice may therefore comprise two circular plates: a front (i.e. top) plate and a back (i.e. bottom) plate.

The front plate may comprise a series of radial apertures or slots extending around the front plate. The radial slots extend partially around the circumference of the front plate.

The back plate may comprise holes located at the same radius as the apertures or slots in the front plate and these can therefore be exposed (i.e. opened) or closed by rotating the front and/or back plates.

The rotation of the front and back plates may be adjusted using simple hand tools such as a spanner to undo a locking nut.

The front and back plates may be mounted on a common axis with a locking screw and nut holding them in place.

During use the required number of holes may be exposed by rotating the front plate with radial slots over the bottom plate with radially drilled holes. Once the desired number of holes are uncovered the two plates may be locked in position by tightening the screw and nut that are located on the axis of the plates.

The adjustable multi-hole orifice may be used as part of conveying apparatus for dry solids. Often such solids contaminate other kinds of adjustable flow control reducing their performance.

The pneumatic conveying apparatus may be any suitable type of apparatus such as a twin vessel pneumatic injection apparatus and a pneumatic conveying apparatus known in the field as a densphase pneumatic conveying apparatus which can be used on any of the following: Gypsum industry for the transfer of pre-calcined materials, additives, plaster and the re-cycling of scrap material Iron and Steel industry for the transfer of sinter fines, dust conveying, lump, granular and pulverised coal and furnace slag Non-ferrous industries for the transfer of reverts, metallurgical dusts, lime, granulated wire, zinc, lump, granular and pulverised coal and dusts Aluminium industry for the transfer of fresh alumina, fluorite, fine dusts, chips, packing lump carbon, machined carbon dust and recycled materials

BRIEF DESCRIPTION OF THE DRAWINGS

Embodiments of the present invention will now be described, by way of example only, with reference to the accompanying drawings in which:

FIG. 7 is a representation of densphase pneumatic conveying apparatus containing adjustable multi-hole orifices according to a further embodiment of the present invention.

BRIEF DESCRIPTION

Generally speaking, the present invention resides in the provision of an adjustable multi-hole orifice plate which can be used in a pneumatic conveying apparatus to assist in the discharge of material.

Figure 1:
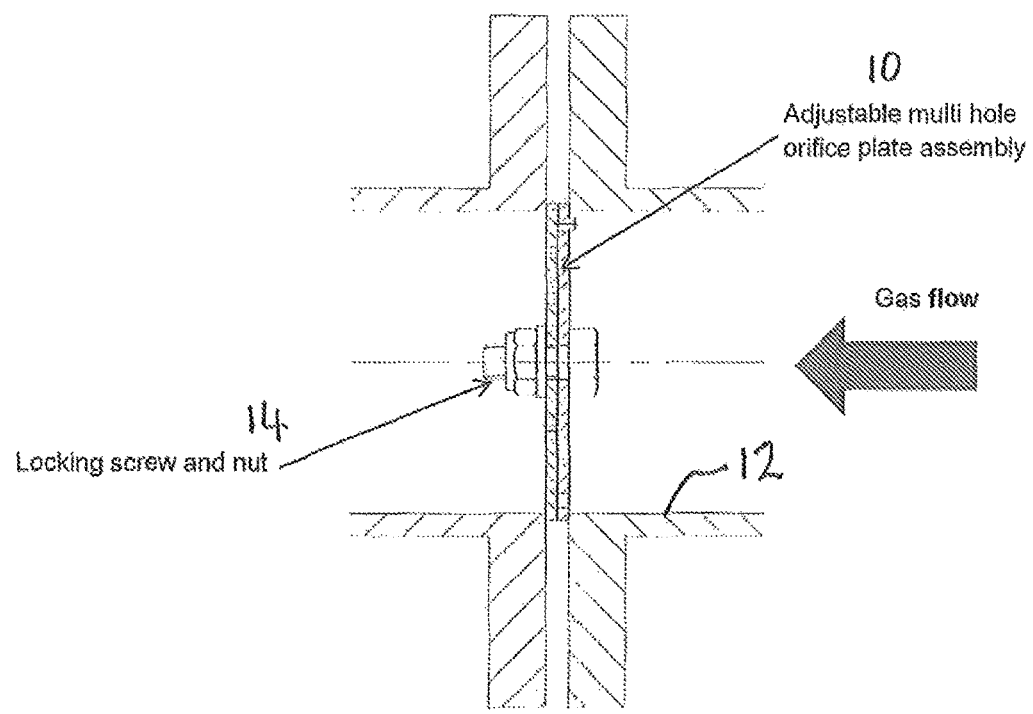
FIG. 1 is representation of a sectional view through an adjustable multi-hole orifice mounted in pipework according to an embodiment of the present invention.

FIG. 1 is a representation of an adjustable multi-hole orifice 10 mounted in pipework 12. There is also shown a locking screw and nut 14. There is shown a gas flow moving from the left to the right through the multi-hole orifice 10.

The adjustable multi-hole orifice 10 is, for example, made from any of the following suitable materials: stainless steel; plastics; ABS and nylon.

Figure 2:
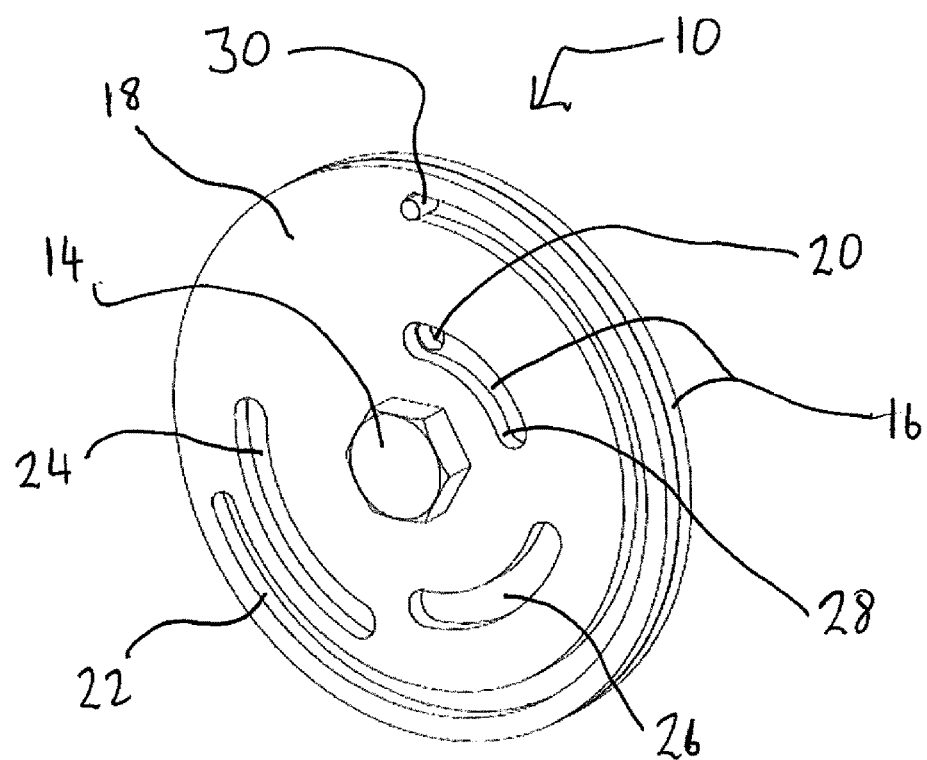
FIG. 2 is a representation of an adjustable multi-hole orifice in a minimum hole position according to an embodiment of the present invention.
Figure 3:
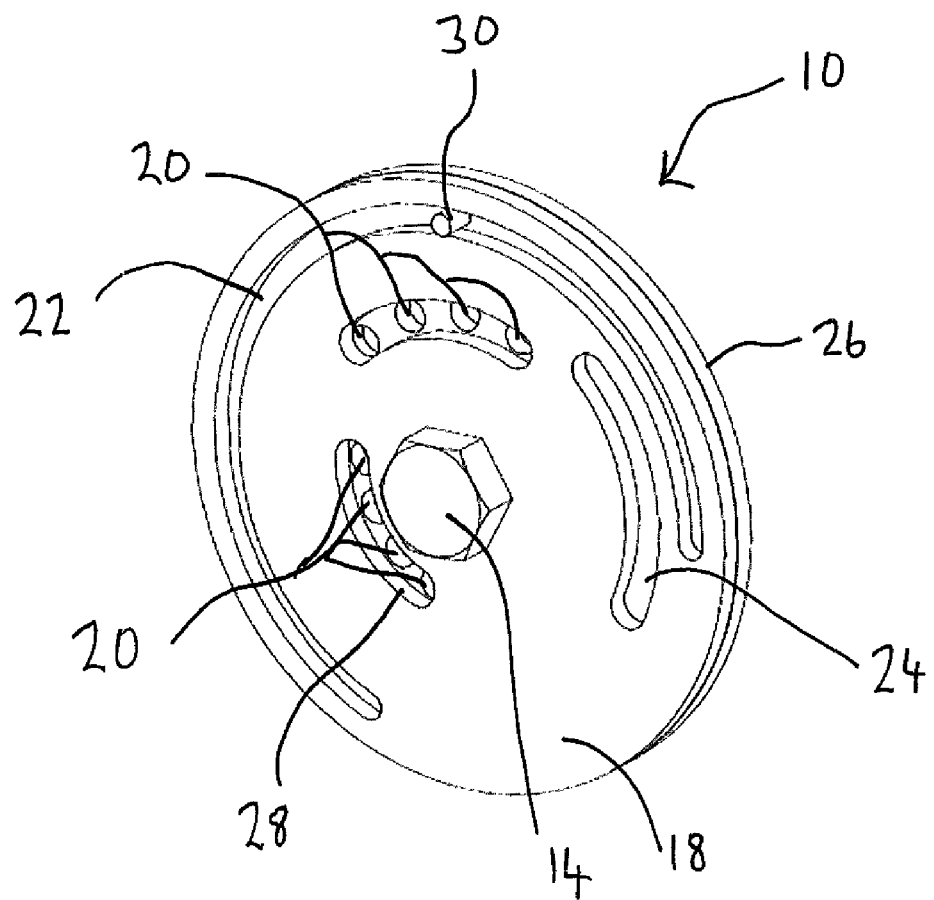
FIG. 3 is a representation of the adjustable multi-hole orifice shown in FIG. 2 in a mid-position.
Figure 4:
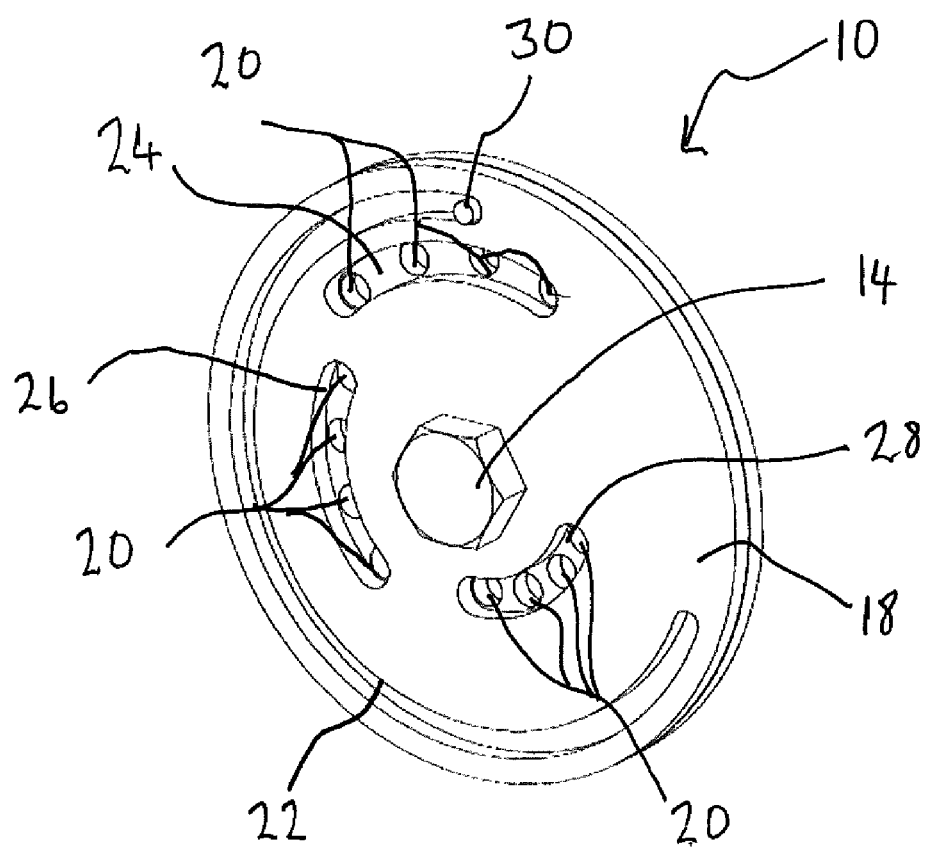
FIG. 4 is a representation of the adjustable multi-hole orifice shown in FIGS. 2 and 3 in a maximum hole position.

FIGS. 2 to 4 show the operation of the adjustable multi-hole orifice 10. The adjustable multi-hole orifice 10 comprises two circular plates: a front (i.e. top) plate 18 and a back (i.e. bottom) plate 16. The front plate 18 has a series of radial slots: a large slot 22 extending around toward the outer periphery of the front plate 18; and three smaller slots 24, 26, 28 closer to the centre of the front plate 18. The back plate 16 has holes located at the same radius as the slots 24, 26, 28 and these can therefore be exposed (i.e. opened) or closed by rotating the front and back plates 16, 18.

The rotation of the front and back plates 16, 18 can be adjusted using simple hand tools. Therefore, as opposed to prior art devices no drilling or welding is required. Moreover, the rotation of the front and back plates 16, 18 can be altered adjacent to the conveying vessel meaning that the alteration can be done very simply and quickly.

The front and back plates 16, 18 are mounted on a common axis with the locking screw and nut 14 holding them in place.

During use the required number of holes 20 is achieved by rotating the front plate 18, with radial slots 22, 24, 26, 28 over the bottom plate 16 with radially drilled holes 20. Once the desired number of holes 20 are uncovered the two plates 16, 18 can be locked in position by tightening the screw and nut 14 that are located on the axis of the plates 16, 18. The maximum number and size of holes 20 are dependent on the size of the plates 16, 18.

The adjustable multi-hole orifice 10 would be used as part of conveying apparatus for dry solids. Often such solids contaminate other kinds of adjustable flow control reducing their performance.

It has been found that the choice of large holes in robust metal sheet will make the device more tolerant of dirt and wear, providing more reliable operation. Wear on one hole in multiple holes also has a lower effect on change in flow than a single hole. This is a further advantage of the present invention.

Other methods for flow control usually involve a single hole. Tests show that multiple holes for the adjustable multi-hole orifice 10 of the present invention will reduce noise when attached to tanks. Therefore, the idea of using a multi hole orifice plate in conjunction with an adjustable device is advantageous.

During commissioning, it is often required to make changes to the orifice plate quickly in order to optimise the conveying performance of the machine. The current method of drilling or welding is time consuming and also subject to poor quality assurance. Pre-drilled holes with pre-defined characteristics as shown in the adjustable multi-hole orifice 10 of the present invention allow far quicker adjustment with improved ability to record the expected gas flow through the plate.

FIG. 2 shows the adjustable multi-hole orifice 10 in the minimum hole position where only one hole 20 is present. The stop pin 30 is shown abutting against the end of the slot 22 and preventing further movement to one side. In FIG. 3 the front plate 18 has been rotated to expose six holes 20. In FIG. 4 the front plate 18 has been further rotated to expose twelve holes 20 and is in the maximum hole position. In the configuration shown in FIG. 4 the maximum amount of flow will be allowed through the orifice 10.

Figure 5:
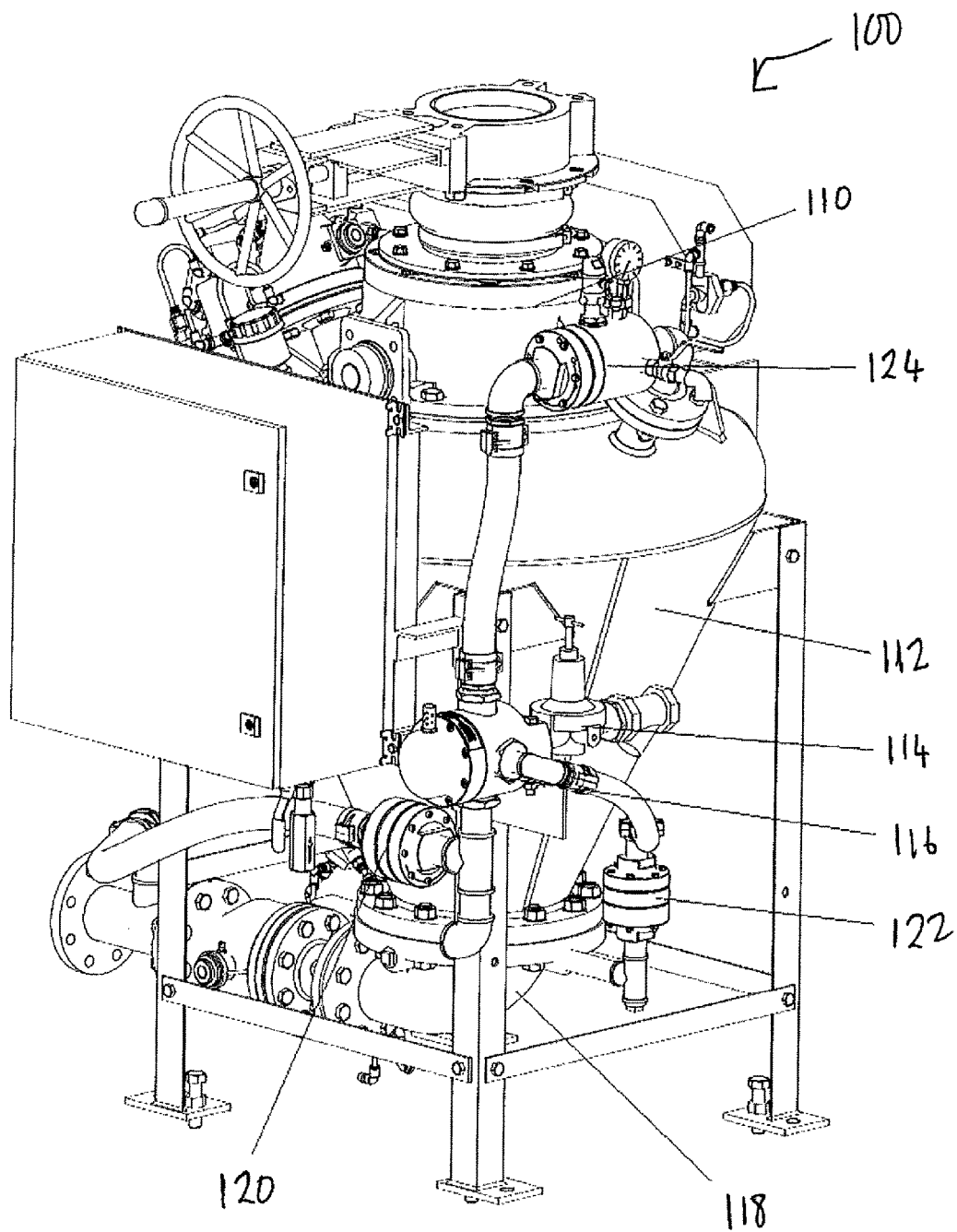
FIG. 5 is a representation of a dispensing vessel containing adjustable multi-hole orifices according to a further embodiment of the present invention.

FIG. 5 is a representation of a dispensing vessel 100 according to the present invention. FIG. 5 shows that the dispensing vessel 100 comprises an inlet dome valve 110, a vessel shell 112, a pressure regulator 114, a main blow valve 116 and an outlet blend 118. In this particular embodiment there are three multi-hole orifice plates 120, 122, 124 according to the present invention. The multi-hole orifice plates 120, 122, 124 are similar to those shown in FIGS. 2 to 4. Therefore, the multi-hole orifice plates 120, 122, 124 can be adjusted as previously described by rotating a front and/or back plate to expose or cover a series of holes which allow the flow of material through the dispensing vessel 100 to be controlled.

Figure 6:
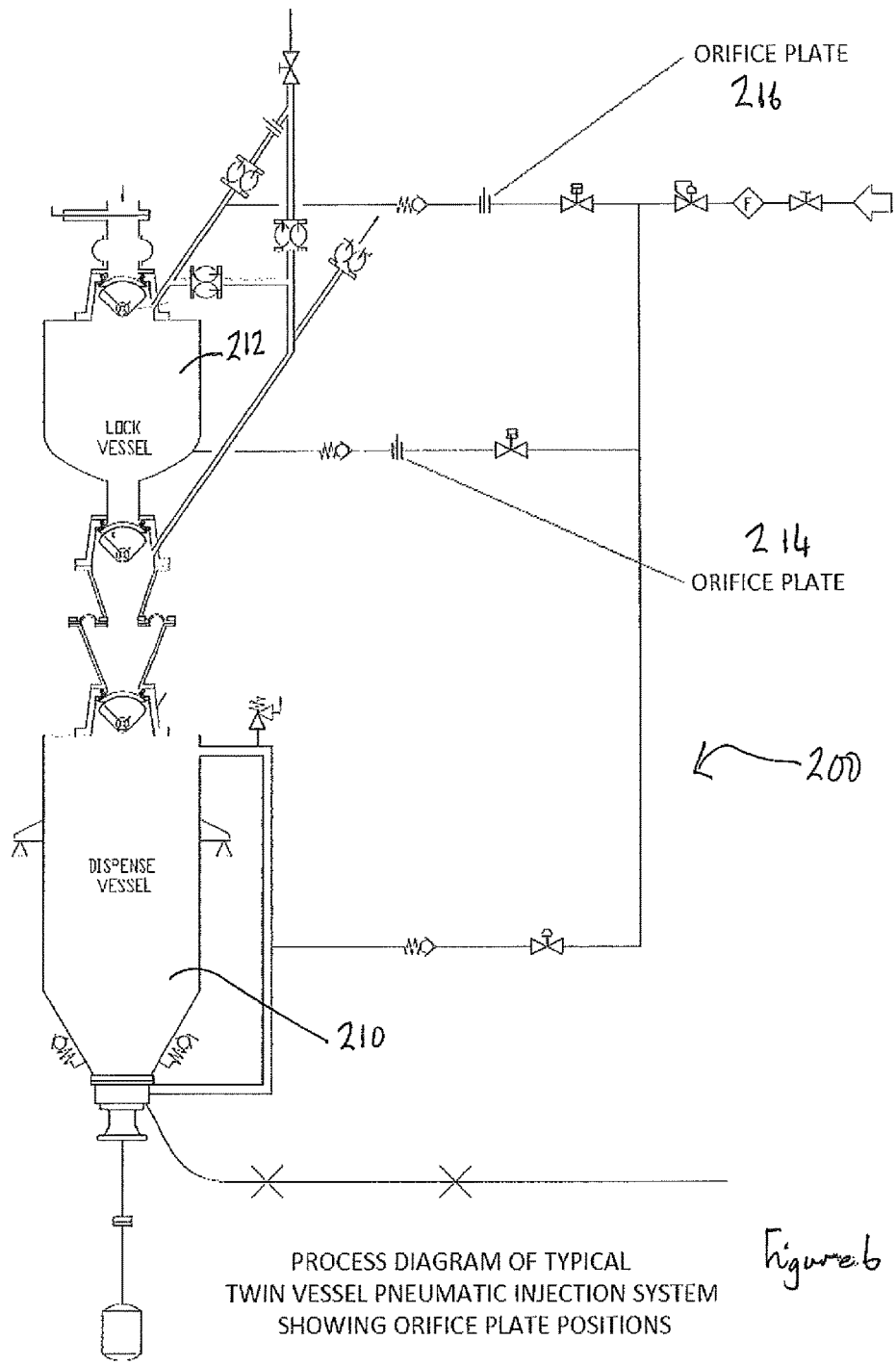
FIG. 6 is a representation of a twin vessel pneumatic injection apparatus containing a dispensing vessel and adjustable multi-hole orifices according to a further embodiment of the present invention.

FIG. 6 is a representation of a twin vessel pneumatic injection apparatus 200 according to a further embodiment of the present invention. There is shown a dispensing vessel 210 and a lock vessel 212. This embodiment of the invention has two multi-hole orifice plates 214, 216. The multi-hole orifice plates 214, 216 are as previously described and operate in a similar manner.

FIG. 7 is a representation of pneumatic conveying apparatus 300 known in the field as a densphase pneumatic conveying apparatus which can be used on any of the following:

Gypsum industry for the transfer of pre-calcined materials, additives, plaster and the re-cycling of scrap material Iron and Steel industry for the transfer of sinter fines, dust conveying, lump, granular and pulverised coal and furnace slag Non-ferrous industries for the transfer of reverts, metallurgical dusts, lime, granulated wire, zinc, lump, granular and pulverised coal and dusts Aluminium industry for the transfer of fresh alumina, fluorite, fine dusts, chips, packing lump carbon, machined carbon dust and recycled materials The pneumatic conveying apparatus 300 comprises a dispense vessel 310 and a lock vessel 312. This embodiment of the invention has three multi-hole orifice plates 314, 316, 318. The multi-hole orifice plates 314, 316, 318 are as previously described and operate in a similar manner.

Whilst specific embodiments of the present invention have been described above, it will be appreciated that departures from the described embodiments may still fall within the scope of the present invention. For example, any suitable type and shape of front and back plate may be used. The device may also comprise any suitable number and arrangement of holes which can be opened and closed by rotating the front and/or back plate.

The invention claimed is:

1. A pneumatic apparatus configured for conveying dry material and comprising:
   a) a source of air pressure;
   b) a reservoir of dry material to be transported;
   c) at least one enclosed pathway along which said dry material is moved by air pressure; and,
   d) at least one flow control structure located within said enclosed pathway, said at least one flow control structure comprising:
      i) a front plate with a plurality of radially configured slots,
      ii) a back plate having at least one series of multiple apertures, each said series of apertures being aligned with at least one radially configured slot when said back plate and said front plate are connected together on a common axis; and,
      iii) a rotating connection structure between said front plate and said back plate, wherein said rotating connection facilitates a variable alignment of multiple apertures on said back plate with radially configured slots on said front plate to adjust air flow through said flow control structure.

2. A pneumatic conveying apparatus according to claim 1, wherein the flow control structure is mounted in said enclosed pathway a flow of gas moving through the slots and apertures in an asymmetrical pattern in the flow control structure.

3. A pneumatic conveying apparatus according to claim 2, wherein said plates are circular.

4. A pneumatic conveying apparatus according to claim 3, wherein the front plate comprises multiple radial slots extending around the front plate at a predetermined radius.

5. A pneumatic conveying apparatus according to claim 4, wherein the back plate comprises multiple series of multiple round apertures located at said predetermined radius.

6. A pneumatic conveying apparatus according to claim 5, wherein the front and back plates are mounted on a common axis with a releasable locking screw and nut holding them in place.

7. A pneumatic conveying apparatus according to claim 6, wherein the pneumatic conveying apparatus comprises an inlet dome valve, a vessel shell, a pressure regulator, a main blow valve and an outlet blend.

8. A pneumatic conveying apparatus according to claim 7, wherein the pneumatic conveying apparatus is a twin vessel pneumatic injection apparatus comprising a dispensing vessel and a lock vessel.

9. A pneumatic conveying apparatus according to claim 8, wherein the dry material comprises:
   a) pre-calcined materials, additives, plaster and the recycling of scrap material;
   b) sinter fines, dust conveying, lump, granular and pulverised coal and furnace slag;
   c) reverts, metallurgical dusts, lime, granulated wire, zinc, lump, granular and pulverised coal and dusts; and,
   d) fresh alumina, fluorite, fine dusts, chips, packing lump carbon, machined carbon dust and recycled materials.

* * * * *